July 30, 1929. E. J. HENLE 1,722,796
TIRE STAND
Filed June 25, 1926
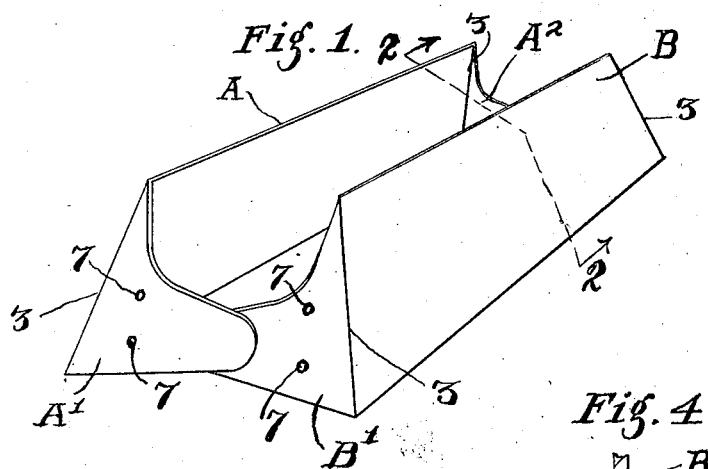
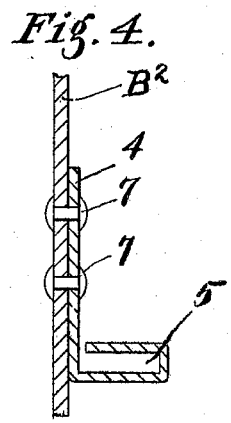
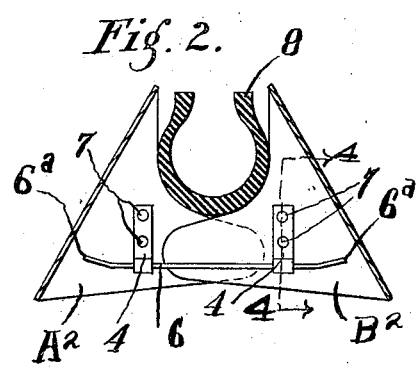
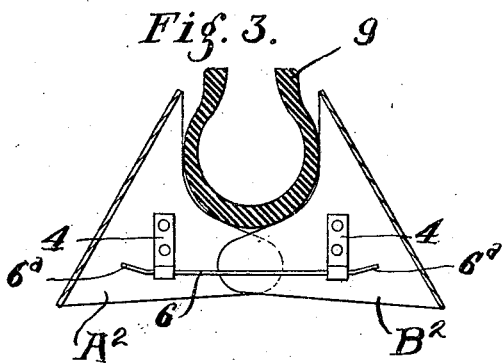
Inventor
Edward J. Henle
By Floyd E. Shannon
Attorney Patented July 30, 1929.

1,722,796

UNITED STATES PATENT OFFICE.

EDWARD J. HENLE, OF AKRON, OHIO.

TIRE STAND.

Application filed June 25, 1926. Serial No. 118,495.

This invention relates to tire stands and has particular relation to a stand adapted to support a tire in a vertical position for display and advertising purposes.

Objects of the invention are to provide a tire stand of simple, durable construction which may be manufactured at a low cost and which in use will provide efficient means for supporting a tire in an upright position.

In tire stands of known construction, it is necessary to provide a stand which will fit a tire of a certain size. Tires differ greatly in size, necessitating the manufacture of stands in a large number of sizes to provide a stand for each size.

A particular object of this invention is to provide a tire stand which may be quickly and conveniently adjusted to fit tires of different sizes and which may be manufactured of one size and which will receive and firmly hold tires differing greatly in size.

An additional object is to provide a rack of the class above indicated which may be composed of card board stock arranged to provide two juxtaposed members each provided with a jaw and to thereby provide spring means for yieldably holding said members in assembled relation and to provide a plain surface at the base surface on each side of the tire which may be utilized for advertising or other printing matter.

A still further object is to provide a tire stand having jaw members yieldably held in assembled relation whereby the jaws will firmly hold tires differing greatly in cross sectional shape.

The above objects are accomplished and additional ends are attained by the novel construction, combination and arrangement of parts hereinafter described and disclosed in the drawing wherein I have shown a preferred form of the invention, it being understood that the invention is capable of various adaptations and that changes and modifications may be made or substitutions resorted to which come within the scope of the claims hereunto appended.

In the drawings like numerals of reference are employed to designate like parts as the same may appear in any of the several views and in which :—

Figure 1 is a perspective view of a tire rack constructed in accordance with this invention, Figure 2 is a cross sectional view taken as indicated by the lines 2—2 of Figure 1 and showing the same with a small sized tire positioned therein, Figure 3 is a like sectional view of the same standard showing a large sized tire positioned therein, Figure 4 is a sectional view taken as indicated by the lines 4—4 of Figure 2 and showing the bracket employed to slidably secure a connecting spring member to each of the said side members.

Proceeding now to a detailed description of the invention with reference to the particular adaptation thereof disclosed in the drawings, the letter A is used to denote one of the side members. The side member A is provided at each end thereof with a flap $A^1$ and $A^2$. The member A is scored as at 3 and the flaps $A^1$ and $A^2$ are bent to extend at substantially a right angle to the main body of the member A. The member B is preferably formed of the same shape and size as the member A and is likewise provide with end flaps $B^1$ and $B^2$. The sections A and B are placed in juxtaposed relation to form a box-like structure with the flaps $A^1$ and $B^1$ in overlapping relation and the flaps $A^2$ and $B^2$ in overlapping relation. The numeral 4 is used generally to denote a bracket which is provided at the lower end thereof with a flat loop or eye 5 which is adapted to slidably receive a flat spring member 6. One of the brackets 4 is suitably secured to each of the flaps $A^1$, $B^1$, $A^2$ and $B^2$ by means of the rivets 7 or other suitable means with the eye 5 in the opposed brackets in axial alinement. The spring 6 is entered in the eye 5 of the brackets 4 in the members $A^1$ and $B^1$ and a like spring 6 is entered in the eyes 5 of the brackets 4 on the flaps $A^2$ and $B^2$. The brackets 4 are preferably composed of flat spring metal and the eye 5 is designed to snugly receive the spring 6 whereby the spring 6 will be frictionally engaged by said bracket so as to be held thereby against unintentional movement. Each spring 6 is provided with an inclined lid portion $6^a$ which will prevent the spring 6 from being accidently removed. Each of the flaps $A^1$, $A^2$, $B^1$ and $B^2$ is provided with a straight lower edge which is inclined upwardly from a horizontal line and each is provided on the upper edge thereof with an inwardly curved surface thereby forming jaws adapted to receive a tire.

In use, the brackets 4 are adjusted on the spring 6 to fit the size of the tire desired to be displayed and the tire 8 is positioned on the rack between the jaws formed by the upper edges of the jaws A¹, B¹, A² and B². The weight of the tire bears downwardly on said flaps thereby tilting the members A and B toward each other. Inasmuch as the lower edge of the flap A¹, B¹, A² and B² are inclined upwardly from a horizontal line, a downward movement of said flap is possible without the lower edges of the flaps resting on the supporting surface. It will thus be seen that a tire is supported by the jaws A¹, A², B¹ and B² and that the weight of the tire will at all times hold the tire firmly clamped between said jaws. If it is desired to display a tire of a larger size, the same stand may be used and the brackets moved outwardly on the spring 6 as shown in Figure 3.

It will thus be seen that I have provided means for holding the members A and B together whereby the jaws will be yieldably held in opposing relation and that a single stand may be used to fit tires of different sizes and different shapes.

Having thus illustrated my invention and described the same in detail, what I claim as new and desire to secure by Letters Patent is:—

1. In a device of the class described, two like sections, a flap on each end of each section, the flaps on each section extending in parallel relation at substantially a right angle to the main body of the section, said sections arranged in juxtaposed relation to form a box like structure with the opposing flaps forming jaw members and a connecting member for each pair of opposing flaps, said connecting member being slidably secured to each flap.

2. In a device of the class described, two like sections, a flap on each end of each section, the flaps on each section extending in parallel relation at substantially a right angle to the main body of the section, said sections arranged in juxtaposed relation to form a box-like structure with the opposing flaps forming jaw members and a spring connecting each pair of opposing flaps said spring being slidably secured to each flap.

3. In a device of the class described like side members, an angularly disposed jaw on each end of each side member, said members being juxtaposed with the opposing jaws in operative relation, a bracket rigidly secured to each jaw, each bracket having a flat eye, said brackets being positioned with the eyes of the brackets on each pair of opposed jaws in horizontal alinement; a flat spring connecting each pair of opposed jaws, each of said springs entered in the eyes of the brackets on each pair of opposed jaws whereby each side member may be tilted on an axis extending along its bottom edge and the jaws slidably moved relative to each other.

4. In a device of the class described, side members, each provided at each end thereof with jaw members which project therefrom in parallel spaced relation, said side members being juxtaposed with the opposing jaw members in operative relation, a straight spring member slidably connected to each pair of opposing jaw members, each of said spring members normally disposed in a horizontal line and normally tending to move said jaws in a closed position.

In testimony whereof I have hereunto set my hand.

EDWARD J. HENLE.